United States Patent [19]
Kachmarik et al.

[11] Patent Number: 5,357,173
[45] Date of Patent: Oct. 18, 1994

[54] BALLAST CIRCUIT ARRANGEMENT FOR A HIGH PRESSURE SODIUM LAMP

[75] Inventors: David J. Kachmarik, North Olmsted; Louis R. Nerone, Brecksville, both of Ohio

[73] Assignee: General Electric Company, Schenectady, N.Y.

[21] Appl. No.: 971,806

[22] Filed: Nov. 5, 1992

[51] Int. Cl.$^5$ ............................................. H05B 37/02
[52] U.S. Cl. ..................... 315/209 R; 315/291; 315/307; 315/224; 315/DIG. 7
[58] Field of Search .................. 315/209 R, 291, 307, 315/224, 208, DIG. 7, DIG. 4

[56] References Cited

U.S. PATENT DOCUMENTS

| | | | |
|---|---|---|---|
| 4,137,484 | 1/1979 | Osteen | 315/209 R |
| 4,535,271 | 8/1985 | Holmes | 315/307 X |
| 4,734,624 | 3/1988 | Nagase et al. | 315/DIG. 7 X |
| 4,980,612 | 12/1990 | Bonilla Gris | 315/209 R X |

*Primary Examiner*—Robert J. Pascal
*Assistant Examiner*—Haissa Philogene
*Attorney, Agent, or Firm*—George E. Hawranko; Stanley C. Corwin

[57] ABSTRACT

Circuits, and methods of using same, are disclosed for pulse operating a sodium vapor lamp and, in response to gating pulses applied to a resonant ballast, the lamp ignites to develop a quasi-resonant bidirectional current waveform through the lamp, the shape of which is controlled to suppress the excitation of acoustic resonant nodes in the lamp. The quasi-resonant bidirectional current waveform oscillates at a prescribed frequency and contains a first group of harmonics, the harmonic content of which is outside any acoustic frequency region associated with the lamp, and further contains a second group of harmonics having a harmonic content which coincides with such acoustic frequency region. The current waveform is caused to decay substantially at the time of ignition of the lamp to quickly reduce the magnitude of the second group of harmonics to thereby suppress excitation of the acoustic frequency region and prevent arc instability in the lamp.

7 Claims, 3 Drawing Sheets

BALLAST CIRCUIT ARRANGEMENT FOR A HIGH PRESSURE SODIUM LAMP

CROSS-REFERENCE TO RELATED APPLICATIONS

The present application is related to U.S. patent application Ser. No. 07/972036, entitled "High Pressure Sodium Lamp Control Circuit Providing Constant Peak Current And Color" and U.S. patent application Ser. No. 07/971,791 entitled "Feedback Controlled Circuit And Method For Powering A High Intensity Discharge Lamp", both filed even-date herewith, assigned to the same assignee as the present invention and herein incorporated by reference.

FIELD OF THE INVENTION

The present invention relates to high pressure sodium vapor lamps and is connected with an improved system, circuit and method of operating such lamps which makes possible an extension of the life of such lamps with a concomitant color enhancement of and nondegradation of color rendition through out the life of such lamps.

BACKGROUND OF THE INVENTION

High pressure sodium vapor lamps have been in use for years and have been widely used for street, roadway and various other outdoor applications. These lamps are generally operated by a conventional ballast comprising windings on an iron core supplied from a 60 Hertz current power supply. The power supply and ballast are designed to limit the current through the lamp and provide a power input which does not exceed the lamp voltage rating. Generally, ballasts contain a special circuit for generating a high voltage low energy pulse to ignite the lamp by causing an arc to jump the lamp electrodes. The magnitude of this high voltage pulse is dictated by the lamp specifications. For example, a 400 watt lamp typically will call for a $1\mu$ sec long pulse of 2250 volts amplitude (minimum) which is applied across the lamp electrodes at a repetition rate of least 50 times per second. This high voltage pulse breaks down the amalgam of sodium and mercury in a xenon gas atmosphere into charged particles. The voltage strikes across the electrodes of the lamp to ignite the lamp. The generation of light from the lamp is caused by a discharge through the sodium vapor in the lamp and is due almost exclusively to the excitation of the sodium atom. Once the lamp starts, the high voltage pulsing circuit is automatically disabled. The prolonged or steady operation of the lamp is then sustained by a prescribed current and voltage providing power input at the lamp's rating. In conventional a.c. operation, as the sodium is vaporized by the heat generated within the lamp, the light turns first to a monochromatic yellow and then gradually to white having a golden or orange cast. Full warm up of the lamp takes about one minute. Lamps operated in the above described manner are extremely useful for outdoor lighting. However, the light cast by such lamps is not suitable for indoor use where premium (white) light or color discrimination are requirements. Various prior art systems have been designed with attempts to obtain the above premium lighting from sodium vapor lamps. These systems and attempts, for the most part, use pulse operation to achieve higher lamp color temperature and improved color rendition while maintaining the average energy input into the lamp at a rated level. U.S. Pat. No. 4,137,484, Osteen (assigned to the assignee of the present invention) discloses one such prior art pulse operated system (inter alia), which patent is incorporated herein by reference for a teaching of the basic principles of operation of those sodium vapor lamps of the type contemplated by the present invention, and in particular to prior art methods of ballasting such lamps using pulsed operation. The metal of a conventional high pressure sodium lamp of the type contemplated by the present invention, and as disclosed in the system of U.S. Pat. No. 4,137,484, contains sodium and usually mercury. The mercury radiation produced by discharge through the sodium is insignificant, however, some radiation from the mercury does appear. In such a system, it is disclosed that, in the time interval during and immediately following the application of a pulse having a rapid rise to the lamp, the higher electronic states of sodium are excited to substantial emission, and in lamps containing mercury, radiation from mercury also appears, but it is insignificant. During pulse operation of the lamp, emission from several sodium lines and a continuum in the blue-green portion of the light spectrum becomes substantially more intense. In addition, the normal light in the yellow-red portion of the spectrum, which is due to self-reversal and broadening of the sodium D lines, is partially suppressed. As a result, an increase in color temperature and an improvement in color rendition index takes place.

The system disclosed in the above patent does not employ any "keep alive" current which can be defined as a constant current over which the pulsed current to the lamp is superimposed, such keep-alive current being intended to provide some current during pulse "off" conditions. Nor does the present invention. A keep-alive current can have a detrimental effect on the highly excited sodium radiation (and mercury radiation if mercury is present) on which the color improvement depends.

The above patent, while it discloses a system and method which provides improved color temperature and enhanced color rendering by powering the lamp with a pulsed current waveform, has certain disadvantages. One of these disadvantages is in a reduction in efficacy over conventional a.c. operation. In the pulsed current waveform system, pulses are used having repetition rates above 500 Hz up to about 2000 Hz and duty cycles from 10% to 35%. Using these pulse rates enables the lamp color temperature to be increased in excess of 400 degrees Kelvin(400 K.). That is, from the normal temperature of about 2050 K. up to about 2500 K. with about a 20% reduction in efficacy. It is also disclosed that color temperature can be raised considerably beyond 2500K but, at the sacrifice of further reduction in efficacy. Thus, it can be seen that a need exists to provide a system and method of pulse operating a sodium lamp which at least improves any such reduction and with increases in color temperature above the norm.

The above patent also recognizes that there can be wall darkening of the lamp which is promoted by the use of both unidirectional and bidirectional pulsing. It is known that wall darkening can be caused by a loss of sodium over time. This loss can be caused by operating the lamp well above its design rating whereby a higher vapor pressure is achieved. However, we have also discovered that wall darkening can also be caused by arc instability within the lamp. Because of this characteristic, we found that if a pulsed current waveform contains harmonics which coincide with the acoustic resonant nodes of the sodium filled arc tube, and if they are of sufficient magnitude during arc strike, an instability will occur in the arc. That is, the arc instead of being confined solely between the electrodes of the lamp, gets distorted or bends to strike the wall of the lamp. This striking can cause overheating, thus raising internal pressures which cause sodium to escape from the lamp and therefore reduce the expected life of the lamp.

Thus it can be seen a further need exists for a system, circuit and method of pulse operating a sodium vapor lamp which prevents the above arc instability problems and which provides a lamp having long life, "high" lumen maintenance and overall lower costs at least partly attributable to the elimination of any keep alive current circuitry.

SUMMARY OF THE INVENTION

Accordingly it is an object of the present invention to provide a circuit for and method of operating high pressure sodium vapor lamps having enhanced color rendition and arc stability and wherein the circuit powers high pressure sodium lamps with a quasi-resonant bidirectional current waveform having a band of harmonics which are suppressed during lamp ignition to prevent the excitation of lamp acoustic resonant nodes to prevent arc instability in such lamps.

It is a still further object of the invention to provide a system and circuit for operating a high pressure sodium filled lamp and which eliminates arc instability in the lamp with a concomitant rise in color temperature and color enhancement.

It is yet another object of the invention to provide a circuit for the pulse operation of a high pressure sodium filled lamp and which ignites the lamp with a quasi-resonant bidirectional current waveform having a rapid rise to a magnitude sufficient to ignite the lamp and a fall time short enough to suppress the magnitude of prescribed harmonics in the current waveform.

The invention is based on the fact that arc instability occurs in the arc tube of a sodium vapor lamp when it is powered by a pulsed current waveform which contains harmonics. A first or narrow band of those harmonics are below any acoustic resonant nodes of the arc tube and have magnitudes which sustain arc stability between the electrodes of the lamp by exciting the higher electronic states of sodium to a state of high emission.

A second or broader band of harmonics resides in the waveform. These harmonics coincide with the acoustic resonant nodes of the arc tube and have magnitudes which, if not suppressed during the ignition of the lamp, can excite the acoustic resonant nodes; the effect being to cause the arc between the electrodes to distort or bend and strike the wall of the arc tube. Thus, arc instability occurs causing lamp life degradation and a lowering of lamp temperature with a concomitant loss in color enhancement.

In accordance with the principles of the present invention, a high pressure sodium (HPS) lamp is pulse operated by the application of an oscillating quasi-resonant bidirectional current waveform shown in FIG. 2. A square wave pulse having a prescribed pulse width is used to generate the pulsed current waveform. The pulsed current waveform has an oscillatory period or pulse width of about ¼ cycle to ½ cycle to that of the square wave pulse, depending on lamp design specifications.

The invention provides an economic design, as no "keep alive" current is required. No such keep alive current is needed between pulses (i.e., between each half cycle of the current waveform) because, once the lamp is warmed up, it can easily restrike the arc upon the application of each pulse across the electrodes of the lamp. Depending upon lamp characteristics, pulse repetition rates from approximately 200 HZ up to about 2 KHZ may be used and with duty cycles from 10% to 50%. By so doing, the color temperature may readily increase in excess of 300 K. That is, from about 2450 K., up to about 2800 K. with improved efficacy over conventional pulse operation and further with extended lamp life. In some lamps, color temperature may be raised considerably beyond 2800 K., if increased efficacy is a requirement.

The above, and other objects, features and advantages of the present invention will become apparent from the following description read in conjunction with the accompanying drawing, in which like reference numerals designate the same elements.

BRIEF DESCRIPTION OF THE DRAWING

In the following detailed description of the invention, reference will be made to the attached drawing in which.

FIG. I is a schematic diagram of a pulse operated system and circuit for ballasting a sodium vapor lamp in accordance with the invention.

DETAILED DESCRIPTION OF THE INVENTION

Figure 1:
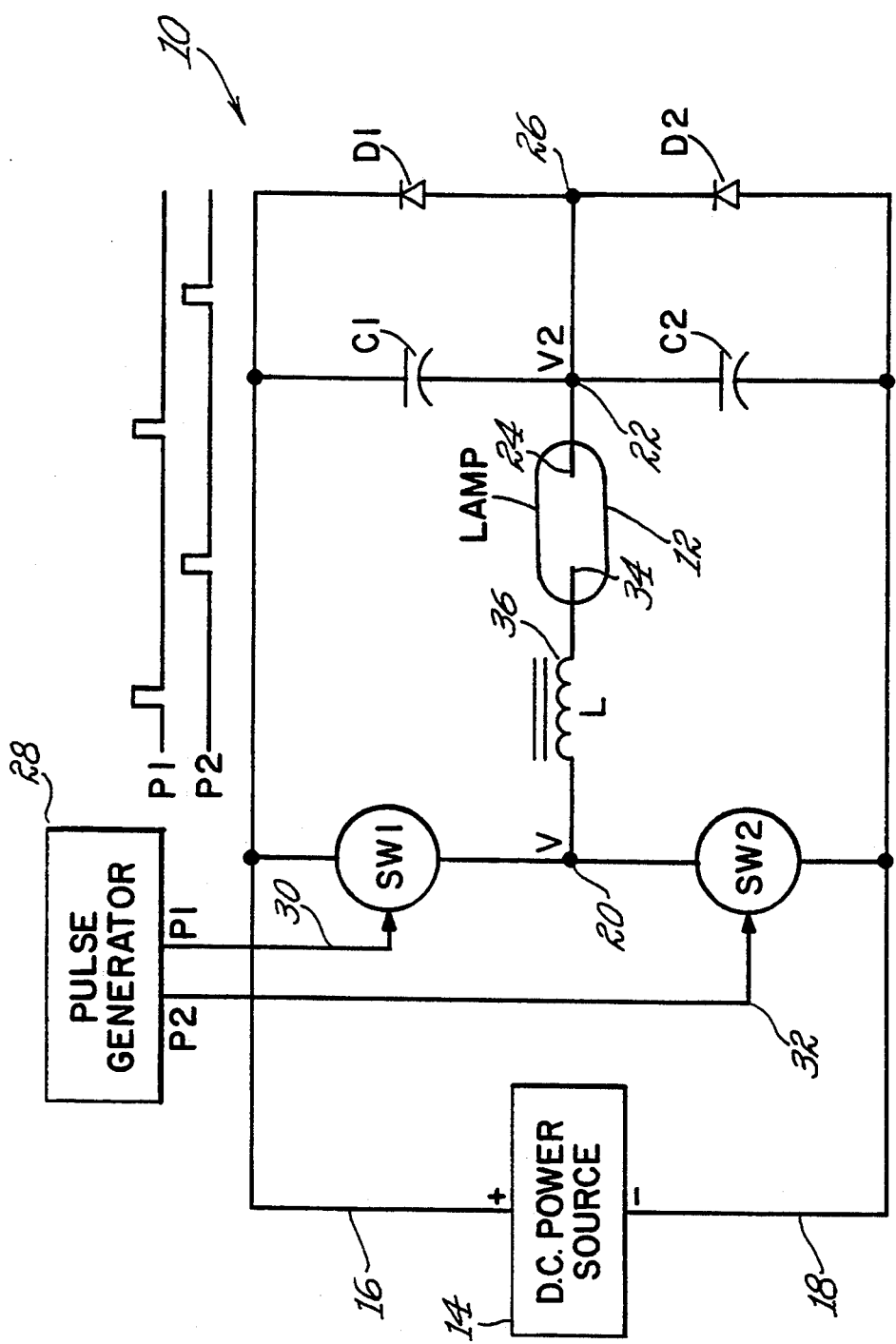

Reference is first made to FIG. 1 of the invention illustrating a light system and circuit generally designated 10. A high pressure sodium (HPS) lamp 12 is typical of the lamps that can be advantageously be pulse-operated for enhanced color improvement and "high" lumen maintenance according to the concepts of the present invention. Generally, similar lamps are manufactured in a variety of sizes ranging from 70 to 1000 watts. The structure of such lamps is disclosed in the aforementioned U.S. Pat. No. 4,137,484.

A DC power source 14 provides sufficient power (voltage and current) for operating the circuit 10 and for powering the lamp 12. The power source 14 normally comprises a conventional full wave rectifier and filter for rectifying an AC voltage to develop a filtered DC voltage at its positive (+) and negative (−) output terminals. This DC voltage is provided on conductors 16 and 18 to a switched input of each of a pair of switches SW1 and SW2 which are connected in series across the output of the power source 14. Conductor 16 provides a positive (+) potential to SW1 and conductor 18 provides a negative (−) potential to SW2. The switched outputs of SW1 and SW2 are connected together at a junction 20 to provide a forcing voltage V for powering the lamp 12 at its rated power input.

A pair of capacitors C1 and C2 are also connected in series across the output of the power source 14, with conductor 16 being connected to one end of capacitor C1 and conductor 18 being connected to one end of capacitor C2. The other ends of capacitors C1 and C2 are connected together at a junction 22 and to one electrode 24 of lamp 12.

The output voltage on conductors 16 and 18 of power source 14 is also provided to a pair of clamping diodes D1 and D2. Diodes D1 and D2 are connected together at a junction 26 to thereby connect D1 and D2 to the lamp electrode 24 via the junction 22.

A pulse generator or controller 28 provides clock or control pulses P1 and P2 to a control input to SW1 and SW2 respectively via conductors 30 and 32. In the preferred embodiment, SW1 and SW2 are field effect transistors (FET's), each having a gate input electrode for turning SW1 and SW2 on in response to pulses P1 and P2 respectively. Various types of power FET devices or switching transistors may advantageously be used. One such well known device is an IRF-740 FET manufactured by International Rectifier Corporation. When SW1 and SW2 are turned on by their respective pulses P1 and P2, a switched forcing voltage V of opposite polarity (i.e. + and − potential) is applied to a second lamp electrode 34 via an inductor or choke 36.

The specifications and characteristics of the lamp 12 determine the values of the inductor 36, capacitors C1 and C2 and the forcing voltage required by the DC power source 14. The lamp employed in the embodiment described herein is a 95 watt white light lamp. A variety of such lamps are manufactured and marketed by General Electric Company as "Lucalox" lamps. Using this lamp, inductor 36 was chosen with a suitable value of 500 microhenries. Capacitors C1 and C2 have values of 2 microfarads each for a total capacitance of 4 microfarads. The only requirement for clamping diodes D1 and D2 is that they be able to handle the maximum current passing through the circuit 10 when they are forward biased or turned on. While many suitable diodes are commercially available, an FED-16FT of the type manufactured by General Instrument Corporation was chosen for diodes D1 and D2.

In addition to the above selections, the power supply or DC power source 14 must be sized to the operating requirements of the lamp 12. In the preferred embodiment, a 250 VDC power source was found suitable to provide the necessary forcing voltage V to operate the 95 watt lamp 12. It will be noted in FIG. 1, that the "high voltage igniter" circuitry commonly employed to initially ignite the lamp 12 is not illustrated. This circuitry is well known in the art and does not form a part of the present invention. As is well known, the high voltage igniter typically applies to the lamp a short pulse (e.g. 1 usec long) of high voltage magnitude (e.g. 1500–2250 volts amplitude). This pulse, typically is applied at a rate of approximately 50 times a second. Once the lamp starts, the high voltage igniter pulsing circuit is automatically shut off and the high voltage pulses are no longer needed to sustain a steady state of operation of the lamp. Once the lamp has reached its normal or prescribed operating temperature (e.g. a color temperature of 2100 K. to 2800 K.), a repetitively applied voltage pulse of much lower magnitude can be used to strike an arc between the lamp electrodes to maintain the prolonged operation of the lamp. This striking of the arc, after initial warm up is commonly referred to as a "restrike" of the arc. The invention pertains to a method and apparatus for generating the restrike voltage across the lamp electrodes and controlling the characteristics of the resultant follow through resonating current waveform which passes through the lamp.

In the ensuing operational description of the invention, and in view of the foregoing, it will be assumed that the high voltage igniter has initially started the lamp and that the lamp is at a proper operating temperature to restrike each time a voltage pulse is applied across the lamp electrodes.

Figure 2:
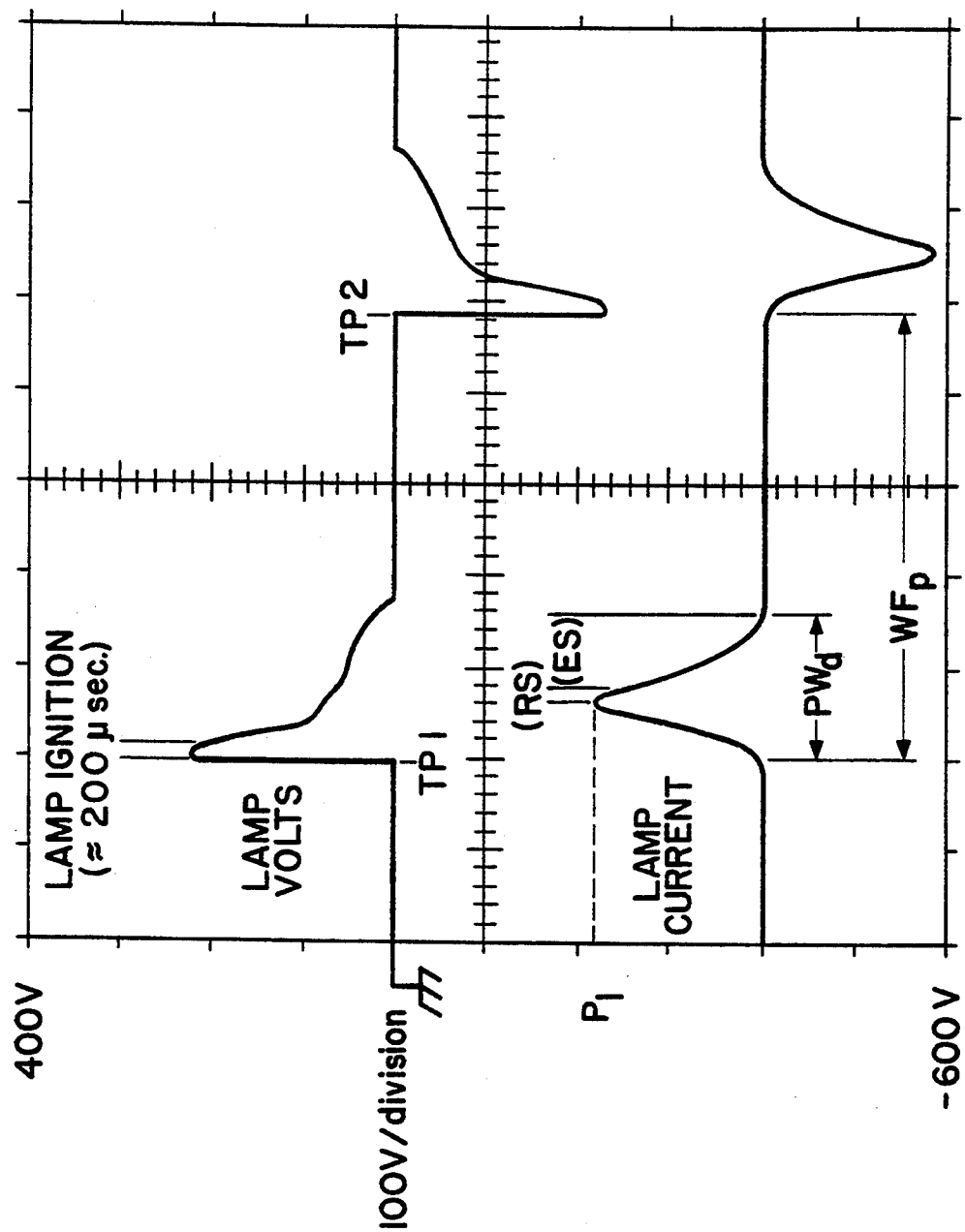
FIG. 2 depicts a pulsed bidirectional voltage signal and corresponding pulsed quasi-resonant bidirectional current waveform useful in understanding the operation of the invention as depicted by FIG. 1.
Figure 3:
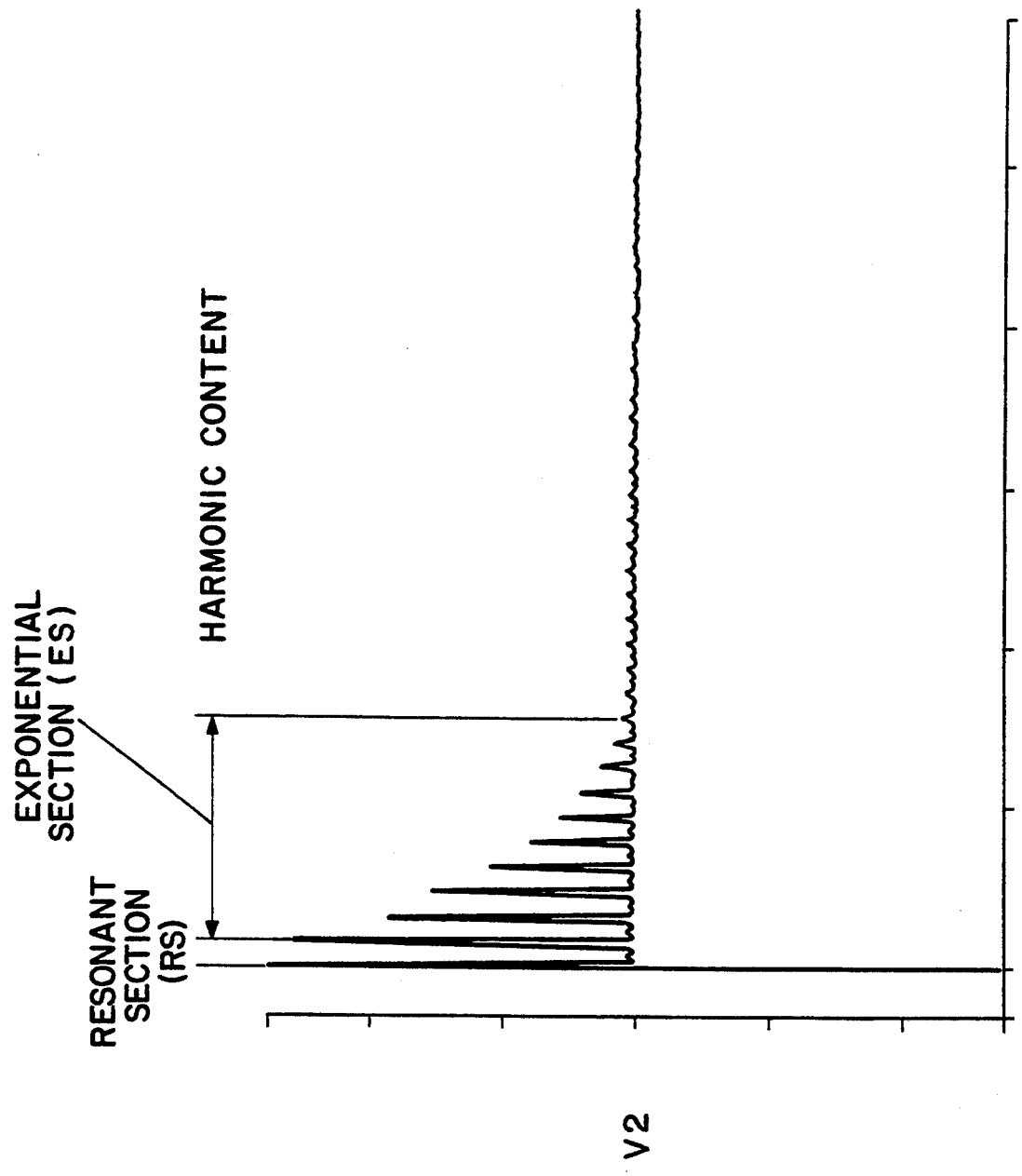
FIG. 3 depicts an experimentally obtained power spectra for the current waveform of FIG. 2 showing the harmonic content of that waveform and is useful in understanding the principles of operation of the invention.

The operation of the invention can best be understood by reference to FIGS. 2 and 3 in conjunction with FIG. 1.

Reference is first made to the pulse generator 28 of FIG. 1 which is generating the pulses P1 and P2. As shown, these pulses are square waves applied to SW1 and SW2 via conductors 30 and 32. Depending upon the operating specifications of lamp 12, pulses P1 and P2 may be generated at a repetition rate of 200 HZ to 2 K.HZ and with a duty cycle of approximately 20% to 50% as adjusted by generator 28.

As previously mentioned, the invention eliminates the need for any keep alive current. This elimination is made possible by selecting the proper repetition frequency, duty cycle and pulse time length or width of P1 and P2 for the lamp 12. The pulse width of P1 and P2 need only have a time length long enough to ensure that lamp 12 restrikes or reignites upon the application of each pulse to SW1 and SW2.

As previously described, SW1 and SW2 are FET switches. To that end, pulses P1 and P2 are logic level signals having binary states which rise and fall between a binary 0 state (−level) and a binary 1 state (+level)to turn SW1 and SW2 on and off. SW1 and SW2 respond to their respective input pulses P1 and P2 to turn on each time the respective pulse goes positive (i.e., to a binary 1). In the absence of a binary 1 signal to a switch, that switch (SW1 or SW2) is turned off or disabled.

In the embodiment described herein, the waveforms shown in FIGS. 2 and 3 were taken with P1 and P2 operating at 800 HZ and a duty cycle of 50%. A duty cycle of approximately 20% has been found to be optimum for the particular lamp 12 employed in FIG. 1. The waveforms shown in FIGS. 2 and 3 were taken with such a square wave applied to SW1 and SW2.

To understand the operation of the invention it is believed advantageous to point out that, when the system of FIG. 1 is first turned on, capacitors C1 and C2 quickly take on a charge substantially equal to the output voltage of source 14. As previously described, this voltage is 250 VDC. Since C1 and C2 are in series, each capacitor will take on a charge of approximately one half of the power source output voltage. For all practical purposes, V2 at junctions 22 and 26 is at a zero reference potential sufficient to enable the lamp 12 to ignite upon the application of a voltage pulse V to the input of inductor 36.

To understand the operation of the invention, it is significant to note that the inductor 36 and capacitors C1 and C2 comprise a resonant tank which is connected in circuit with the lamp 12. The resonant frequency of this LC circuit is given by:

$$f = 1/\sqrt{LC} \ (2\pi) \qquad \text{eq. 2}$$

Where L is the inductance of inductor 36 and C is the of the capacitive values of C1 and C2.

FIG. 2 depicts a bidirectional Quasi-Resonant waveform of the lamp voltage and lamp current pulses generated by the activation of the tank circuit when SW1 and SW2 are turned on and off by P1 and P2. The peak current, $I_p$, of the current pulse flowing through the lamp 12 is defined by the characteristic impedance of the resonant system and the forcing voltage V (see FIG. 1) and is given by:

$$I_p = \frac{V}{\sqrt{\frac{L}{C}}} \qquad \text{eq. 2}$$

The pulsed forcing voltage V at its peak has substantially the same magnitude as the power source output voltage, and to that extent they are one in the same.

It will also be noted in FIG. 2 that the lamp current pulse has an exponential decay time. That decay time is defined by the arc resistance R, and the resonant inductance L, time constant where:

$$TC = \frac{L}{R} \qquad \text{eq. 3}$$

With C1 and C2 charged as previously described, let it now be assumed that the pulse generator 28 is generating pulses P1 and P2 as shown in FIG. 1. It should also be noted that lamp 12 has been previously ignited by the high voltage igniter (not shown), thus preparing the lamp to conduct current.

The first pulse generated is P1, which turns on SW1. The closing of SW1 applies the forcing voltage V at junction 20 to the input of the inductor 36. The forcing voltage V has a very rapid rise (almost vertical) and rises to approximately the +250 volt level provided from the power source 14 via conductor 16. This forcing voltage V generates a potential across the lamp electrodes 24 and 34 with respect to V2 at junctions 22 and 26. This potential difference causes the arc to jump between the electrodes 24 and 34, thus effecting a restrike and ignition of the lamp. This ignition of the lamp takes place at the time of occurrence of the P1 pulse as shown at time TP1 in FIG. 2. As there shown, the lamp 14 ignites within approximately 200 microseconds of the forcing voltage across the lamp achieving its maximum amplitude.

It is significant to note that at the instant of ignition, the lamp impedance drops significantly causing the lamp current to rise in a resonant manner toward Ip. As the lamp current is increasing toward $I_p$, the voltage across capacitor C1, that is, $V_{c1}$ is decreasing whereas the voltage across capacitor C2, $V_{c2}$, is increasing in a resonant manner until the lamp current is divided equally between C1 and C2 each having a value of $I_{lamp}/2$. When $V_{c1} = -V_d$ (the voltage across diode D1 or D2) and $V_{c2} = V + V_d$, the peak current $I_p$ has been reached and the current through capacitors C1 and C2 ceases to flow. At this point, the resonant portion ceases and current continues to flow through the path formed by switch SW1, inductor L, the lamp and diode D1. The commencement of current flow through diode D1 indicates the beginning of the exponentially decaying portion of the lamp current. In the alternate direction of operation, that is, the negative half-cycle, a similar scenario occurs but it is important to note that at the start of the first negative cycle and successive positive cycle, the capacitor voltages will be as follows:

a) Positive lamp current - $V_{c1} \cong V$, $V_{c2} \cong 0$
b) negative lamp current - $V_{c1} \cong 0$, $V_{c2} \cong V$.

These voltage conditions are a consequence of the states that the capacitors reach at the end of the exponentially decaying portion of the lamp current.

Returning now to the operation of the circuit during the negative half-cycle, for the first negative half cycle, pulse P2 is applied closing switch SW2. Prior to this, P1 has already been removed thereby establishing that both SW1 and SW2 switches are open. With switch SW2 closed, the entire voltage V is applied across the lamp electrodes 24, 34 causing the lamp 12 to conduct current in the negative direction. During this time the voltage across capacitor C2, $V_{c2}$, resonantly decreases toward $-V_d$ and the voltage across capacitor C1 resonantly increases toward $V + V_d$. As with the positive half-cycle, the magnitude of the lamp current during the negative half-cycle is limited to $V \sqrt{L/C}$. When the lamp current reaches $-I_p$, the current through capacitors C1 and C2 ceases to flow; lamp current then continues to flow through the path formed by switch SW2, inductor L, lamp 12 and diode D2, thus maintaining conduction of the lamp current. The conduction of current through diode D2 indicates the end of the resonant portion of the lamp current of the negative half-cycle and the beginning of the exponentially decaying portion of such lamp current. Finally, the lamp current exponentially decays toward zero with the voltage across capacitors C1 and C2 essentially being maintained at $V_{c1} \cong V$ and $V_{c2} = 0$. This cycle then repeats itself for continuous operation of the lamp 12.

Reference is now made to the lamp current waveform in FIG. 2 and to FIG. 3. At substantially the time of ignition (TP1), the forcing voltage V is applied to the resonant tank circuit to start its resonant function. This application effects the generation of the lamp current pulse waveform as shown in FIG. 2. This current pulse resonates with the frequency "f" and to a peak amplitude or height Ip. FIG. 3 depicts an experimentally obtained power spectra taken at V2 for a positive half cycle of that current pulse waveform at an operating frequency of 800 HZ. As can be seen, this power spectra shows the harmonic content of the current waveform and substantially follows the current waveform of FIG. 2.

As can be seen in FIGS. 2 and 3, the current waveform contains a resonant or sinusoid section (RS) and an exponential section (ES). For the disclosed current waveform, it can be shown that the majority of the higher magnitude harmonics are contained within a narrow band or bandwidth, where such bandwidth is defined by the relationship:

$$B = \pi/t_{rise}$$

and $t_{rise}$, or the rise time, is defined as either the time to rise from the minimum to the maximum value of the waveform or, the time to fall from the maximum value to the minimum value of such waveform, whichever is smaller. As can be seen in FIG. 2, the current waveform offers both relatively long rise and fall times but within a short duration of the waveform period ($WF_p$) which thereby results in a high concentration of harmonics in a small band. As such, by maintaining this "soft" rise and fall for the current waveform, the higher magnitude harmonics are concentrated at lower frequencies and away from the acoustic resonant nodes of the lamp 12. The results of such lamp operation are shown in FIG. 3 wherein it is shown that the harmonic content is of such a small magnitude that the arc formed between electrodes 24 and 34 will be stable and exhibit enhanced color characteristics.

To understand how the above decay of the current waveform is effected, it is necessary to recall how and when V2 was developed and that the clamping diode D1 was forward biased to prevent V2 from rising above +250 volts.

During resonance of the tank circuit, and the consequent resonance of the current pulse waveform at its peak $I_p$, the voltage V2 reaches a value of:

$$V2 = V + V_D \qquad \text{eq. 4}$$

Due to the operational characteristics of the resonant tank circuit (i.e., L and C), the magnitude of V2 at this time of resonance will be sufficient to forward bias diode D1. When diode D1 conducts, it clamps V2 at approximately the value of the positive potential of the power source 14 (i.e. V or +250 volts). Diode D1 also clamps the voltage across capacitor C1 to $-V_D$, while capacitor C2 quickly charges to $V + V_D$, to effectively end the resonant section (RS) of the current waveform. At the instant of clamping, the exponential section (ES) starts as the inductor 36 begins its discharge through the lamp impedance to complete the pulse width PWd of the pulse current waveform as shown in FIGS. 2 and 3. The lamp 12 will remain lit through the discharge period and will extinguish itself at substantially the end of PWd or (ES), at which time there is insufficient voltage and current through the lamp to maintain a flow of plasma. The capacitors C1 and C2 are now at: $V_{C1} \cong 0$ and $V_{C2} \cong V$ whereby the potential of V2 at junctions 22 and 26 is established in preparation to restriking the lamp upon the generation the pulse P2.

Upon the application of P2 to SW2, the circuit will operate in the same manner as just described, except that a negative voltage pulse V is applied to the lamp resonant tank circuit when SW2 is turned on. As can be seen in FIG. 2, the lamp restrikes at time TP2 to generate the lamp voltage and current waveforms in the opposite or negative direction to complete one waveform period $WF_p$ of the bidirectional quasi-resonant current waveform shown in the lower half of FIG. 2.

In the present invention, the bidirectional current operation has the distinct advantage of extending the life of the lamp electrodes. This is due to the fact that no keep alive current is required. In those lamps employing a keep alive current, the current flows in one direction between the cathode and anode elements of the lamp. It is known that this unidirectional constant current flow causes a deterioration of those elements. In the present invention current flows bidirectionally through the lamp, to thus average out the direction of current flow between the lamp electrodes. As a result, anodes can be eliminated and substituted with cathode or electrode elements. The elimination of keep alive current circuitry also has the advantage of providing a system to the consumer at a lower cost.

It was previously mentioned that the lamp 12 extinguishes at the termination of each half cycle of the current wave pulse. This extinguishing does not cause any degradation in efficacy or cause lamp flicker, because the pulses P1 and P2 are provided at a frequency high enough that lamp temperature is maintained while the short interval between restrikes is rapid enough to be indiscernible to the human eye.

In view of the foregoing description it can now be seen how the present invention provides a method and apparatus for powering a lamp with a quasi-resonant bidirectional current waveform which contains the proper harmonics to give both enhanced color temperature and outstanding arc stability. Bidirectional pulse switching using pulses P1 and P2, effects the generation of bidirectional pulses having a forcing voltage V which is applied to a clamp controlled resonant tank circuit connected to restrike the lamp on each pulse. The tank circuit oscillates at a natural frequency and generates harmonics, some of which are outside the lamp acoustic resonant nodes and others which coincide with those nodes. In response to the voltage pulse, the tank circuit is energized to provide a voltage pulse across the lamp to effect the generation of a quasi-resonant current waveform through the lamp. The quasi-resonant waveform contains a narrow band of harmonics in a resonant section at substantially its peak which are outside the acoustic resonant nodes and which contribute to arc stability between the lamp electrodes. The current waveform also contains a second or broader band of harmonics in an exponential section of the current waveform, at least some of which coincide with the acoustic resonant nodes. The voltage waveform across the lamp is clamped at a prescribed peak amplitude to thus clamp the peak of the current waveform. This clamping effectively stops the resonant function of the tank circuit.

As a result of the clamping, the exponential section of the current waveform begins, whereby the tank circuit inductor discharges through the lamp impedance. This discharge creates an exponential decay of the current waveform to quickly suppress the magnitude of the harmonics in the second frequency band. This suppression thus eliminates the excitation of the lamp acoustic resonant nodes and prevents arc instability.

The bidirectional switching of current through the lamp generates an optimal quasi-resonant bidirectional current waveform (i.e., modified ac waveform) which contains a high percentage of its harmonic content within a very narrow band, the harmonic content of which contributes to outstanding arc stability between the lamp electrodes to thus provide both enhanced color temperature and lamp longevity.

It will be apparent that the embodiments disclosed herein are only exemplary, and that various modifications can be made that are within the scope of the invention as defined in the following claims. For example, capacitors C1 and C2 can be connected in parallel between junction 22 and either of conductors 16 or 18. The only requirement for such a parallel connection is that the total capacitance not be changed from the total capacitance in the series connection of C1 and C2 shown in FIG. 1. In the disclosed embodiment, this capacitance is four microfarads. It is obvious that a single four microfarad capacitor could be substituted for two parallel capacitors of two microfarads each.

When one of the capacitors, C1 or C2, is eliminated as described above, the circuit operates substantially in the same manner as previously described. However, clamping diodes D1 and D2 must remain in the circuit to ensure peak current clamping and termination of the resonant section of the quasi-resonant bidirectional pulse current waveform.

What is claimed is:

1. A method of operating a high pressure metal vapor lamp which utilizes a ballast circuit arrangement having a resonant tank portion, the high pressure metal vapor lamp of a type having a filling of sodium with an envelope provided with spaced electrodes disposed therein for producing, at a rated power input, an arc therebetween to ignite said lamp, which method comprises the steps of:

(a) energizing said lamp by applying to the electrodes thereof a bidirectional voltage waveform having a frequency, time duration and magnitude sufficient to provide a forcing voltage to said lamp at approximately said rated power input;

(b) in response to said bidirectional voltage waveform, developing for said lamp a quasi-resonant bidirectional current waveform which oscillates at a prescribed frequency having a first group of high magnitude harmonics, the harmonic content of which is below an acoustic resonant nodes of said lamp and a second group of harmonics which occur outside of a second bandwidth associated with said bidirectional current waveform, the harmonic content of which coincides with the resonant nodes of said lamp, said bidirectional current waveform being generated so as to avoid the use of a keep-alive current portion associated therewith; and (c) at a prescribed time following the energizing of said lamp, by selection of an appropriate time constant for said resonant tank circuit, causing said quasi-resonant bidirectional current waveform to decay with a fall time rapid enough to quickly reduce the magnitude of the harmonics in the second bandwidth to suppress excitation of said acoustic resonant nodes and thus prevent arc instability in said lamp.

2. The method of claim 1 wherein the frequency of said bidirectional voltage waveform is from approximately 200 Hertz to approximately 2 kilohertz.

3. The method of claim 1 wherein said bidirectional voltage waveform has a duty cycle of from 10 percent to 50 percent.

4. The method of claim 1 wherein said first group of harmonics has a bandwidth lower than a lowest acoustic frequency associated with said lamp.

5. A circuit for operating a high pressure metal vapor lamp of a type having a sodium filling with an envelope provided with spaced electrodes disposed therein for providing, at a rated power input, an arc therebetween to ignite said lamp and sustain the operation thereof, which circuit comprises:

(a) means for generating gating pulses of a prescribed frequency and pulse duration;

(b) means, responsive to said gating pulses, for applying a bidirectional voltage waveform across the electrodes of said lamp at approximately said rated power input and develop, from said bidirection voltage waveform, a quasi-resonant bidirectional current waveform which oscillates at a prescribed frequency having a first group of harmonics, the harmonic content of which is outside any acoustic frequency region associated with said lamp and a second group of harmonics which coincides with such acoustic frequency region of said lamp, said bidirectional current waveform being generated so as to avoid the use of a keep-alive current portion associated therewith; and (c) means, responsive to said bidirectional voltage waveform achieving a prescribed magnitude, for causing said quasi-resonant bidirectional current waveform to decay with a fall time of sufficiently short duration so as to reduce the magnitude of said second group of harmonics.

6. In combination, a high pressure metal vapor lamp of a type having a filling of sodium within an envelope provided with spaced electrodes disposed therein for producing, at a rated power input, an arc therebetween to ignite said lamp, a pulse generator for generating gating pulses, a DC power source for producing a forcing voltage for said lamp at approximately said rated power input, switch means connected across the output of said DC power source and responsive to said gating pulses for generating at an output thereof, bidirectional pulse signals at approximately said rated power input, and which are effective to ignite said lamp, at least one capacitor connected between a first electrode of said lamp and at least one output of said DC power source, clamping means connected across the output of said DC power source and further being connected to the first electrode of said lamp, and inductor means connected between the output of said switch means and a second electrode of said lamp, said at least one capacitor and said inductor means comprising a resonant tank circuit and being responsive to the bidirectional pulse signals provided at the output of said switch means for providing a bidirectional voltage waveform to ignite said lamp and energize said resonant tank circuit to generate a quasi-resonant bidirectional current waveform through said lamp, said bidirectional current waveform being generated so as to avoid the use of a keep-alive current portion associated therewith, said bidirectional current waveform oscillates at a prescribed frequency having a bandwidth of harmonics, the harmonic content of which is below any acoustic resonant nodes of said lamp, and a second group of harmonics outside of said bandwidth, the harmonic content of which coincides with the acoustic resonant nodes of said lamp; said clamping means clamping the bidirectional voltage signals at a prescribed magnitude substantially equal to said forcing voltage to effectively end the resonant function of said resonant tank circuit to enable said inductor means to discharge through said lamp whereby said quasi-resonant bidirectional current waveform decays with a fall time of sufficiently short duration so as to reduce the magnitude of said second group of harmonics.

7. The method of claim 6 wherein said gating pulses have a frequency from approximately 200 Hertz to approximately 2 kilohertz and a duty cycle from 10 percent to 50 percent.

* * * * *